United States Patent

Petrigalla

[15] 3,675,105

[45] July 4, 1972

[54] CURRENT SENSING APPARATUS

[72] Inventor: Andrew Petrigalla, Parma, Ohio

[73] Assignee: A. O. Smith Corporation, Milwaukee, Wis.

[22] Filed: Jan. 18, 1971

[21] Appl. No.: 107,255

[52] U.S. Cl. ................................................. 318/356
[51] Int. Cl. ........................................................ H02p 5/16
[58] Field of Search .................. 318/332, 356, 521, 530, 532

[56] References Cited

UNITED STATES PATENTS

| | | | |
|---|---|---|---|
| 3,518,518 | 6/1970 | Ford | 318/332 |
| 2,708,260 | 5/1955 | Comstock | 318/332 |
| 2,804,584 | 8/1957 | Sims | 318/332 |
| 3,284,688 | 11/1966 | Black | 318/332 |

*Primary Examiner*—Bernard A. Gilheany
*Assistant Examiner*—Thomas Langer
*Attorney*—Andrus, Sceales, Starke & Sawall

[57] ABSTRACT

A current transformer having a pair of primary windings is connected between a single phase thyristor-diode full-wave bridge network and a shunt field winding of a D.C. motor to linearly sense the direct current flowing within the field winding. Opposed magnetic flux signals are alternately induced within the current transformer core by the direct current flowing through the winding. A secondary winding is coupled to the current transformer core to provide an alternating current signal proportional to the flux signals. A full wave rectifier is connected to the secondary winding and supplies a unidirectional signal to a parallel connected resistor thereby providing an isolated analog output voltage proportional to the direct current flowing within the D.C. motor field winding.

9 Claims, 2 Drawing Figures

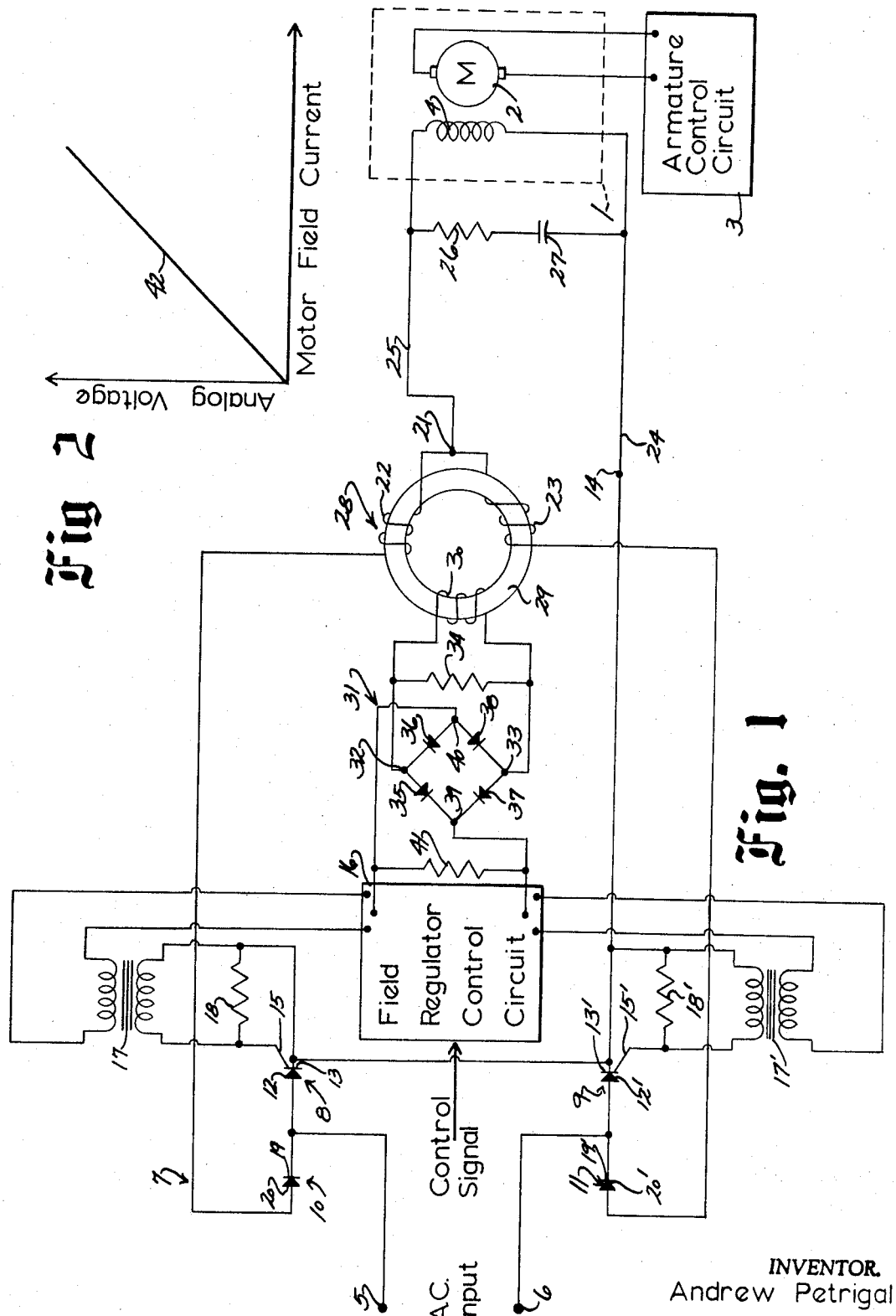

CURRENT SENSING APPARATUS

BACKGROUND OF THE INVENTION

This invention relates to a circuit for sensing the direct current flowing in a load circuit supplied from an A.C. source by a controlled bridge circuit.

A load current is often detected to monitor a load or, through a suitable control loop, to control the energization of the load or the like. Thus, direct current motors may be controlled by suitable load current responsive regulators.

Current transformers have been connected to alternating current inputs to provide a feedback control signal to regulator circuits for controlling the firing of rectifying conduction circuits. Such control signals, however, have not effectively provided an isolated signal completely analogous to the direct current supplied by the rectifying circuits due to the inductive nature of the load circuits receiving the rectified direct current output.

Saturating reactors connected to the direct current output of rectifying conduction circuits have also been employed to provide a stabilizing signal to D.C. current regulators, as shown in the patent to Black, U.S. Pat. No. 3,284,688, issued Nov. 8, 1966. The output of the reactor provides a voltage proportional to the rate of change of the rectified current through the reactor only at low currents and decreases to zero as the current increases. Thus, a separate sensing circuit is provided to supply additional stabilization signals at the higher current levels.

SUMMARY OF THE INVENTION

This invention relates to a circuit for sensing the direct current flowing in a load circuit supplied from an A.C. source by a full wave controlled bridge circuit, and particularly to accurate sensing of the direct current field current of a D.C. motor winding to provide close regulation of motor operation.

Generally, in accordance with the present invention, a conduction means is connected to an input means for receiving an alternating input current and selectively conducting the opposite half cycles as a direct current to a load circuit. A transformer means is coupled with alternately conducting sensing means to conduct the opposite half cycles of the alternating input circuit such that the current in each conducting sensing means changes from zero to the load current during each related half cycle. In a highly satisfactory and novel system, a core means is magnetically coupled to the conduction means for providing alternately induced, oppositely polarized magnetic flux signals with respect to an output means, each of which varies proportionally to the corresponding half cycles of the direct current supplied to the load circuit. The output means is magnetically coupled to the core means to provide an isolated analog output signal proportional to the alternately induced opposing magnetic flux signals varying within the core means.

In one form of the invention, a pair of primary windings are independently disposed about the core means and connected as a part of the conduction means to alternately induce opposing magnetic flux signals in the core proportional to the direct field current flowing through the primary windings. A secondary winding is disposed about the core to sense the varying flux signals and provides an alternating current output signal proportional to the direct current supplied to the load circuit. A full wave rectifier is connected to the secondary winding to provide a unidirectional output current signal to a parallel connected resistor thereby establishing an isolated analog voltage signal proportional to the direct current flowing through the load circuit.

In a preferred form of the invention, the conduction means includes a single phase thyristor-diode bridge circuit controlled by a regulator circuit and connected to an A.C. source for providing a D.C. current to a load circuit. A core means is magnetically coupled to the conduction means for providing alternately induced, oppositely polarized magnetic flux signals with respect to an output means, each of which varies proportionally to a corresponding half cycle of the direct current supplied to the load circuit. The output means is connected to the regulator circuit to provide an isolated analog feedback signal proportional to the direct current supplied to the load circuit.

BRIEF DESCRIPTION OF THE DRAWING

The drawing furnished herewith illustrates the best mode presently contemplated by the inventor and clearly discloses the above advantages and features as well as others which will be readily understood from the detailed description thereof.

In the drawing:

FIG. 1 is a schematic view of an electrical circuit for selectively supplying a direct current to a field winding in a D.C. motor from an alternating current source and including a current sensing apparatus to provide an isolated analog output voltage proportional to the field current; and FIG. 2 is a typical graphical illustration of the isolated analog output voltage vs. the motor field current.

DESCRIPTION OF THE PREFERRED ILLUSTRATED EMBODIMENT

Referring to the drawing and particularly to FIG. 1, the illustrated embodiment of the invention includes a direct current motor 1 having an armature 2 which is selectively energized through an armature control circuit 3. The motor 1 further includes a shunt field winding 4 which is selectively energized by a direct current supplied through a controlled circuitry, as will be more fully described hereinafter.

A pair of input terminals 5 and 6 are connected to receive a single phase alternating current signal which is selectively supplied to field winding 4 through a thyristor-diode bridge circuit 7. Specifically, a pair of thyristors 8 and 9 and a pair of diodes 10 and 11 are connected in bridge circuit configuration to selectively supply a full wave direct current output when energized from a single phase, alternating current source. Only the construction and operation of thyristor 8 and diode 10 and the associated circuitry connected therewith will be described in detail since thyristor 9 and diode 11 operate similarly and the corresponding elements will be designated with identical numbers primed.

The thyristor 8 contains an anode 12 connected to input terminal 5 and a cathode 13 connected to an output terminal 14. A gate 15 of thyristor 8 is connected to a field regulator control circuit 16 through a transformer 17 and is selectively pulsed to provide an adjustable current conduction to output terminal 14 in a manner well known to those skilled in the art. A resistor 18 is connected to cathode 13 and to gate 15 and is further connected across the output of transformer 17 to provide a bias to thyristor 8 when pulsed by regulator 16 to thereby permit conduction.

The diode 10 contains a cathode 19 mutually connected to input terminal 5 and to anode 12 of thyristor 8 and further contains an anode 20 connected to an output terminal 21 through a primary winding 22. Also, the anode 20' of diode 11 is connected to output terminal 21 through a primary winding 23.

The output terminals 14 and 21 are connected to energize field winding 4 through lines 24 and 25, respectively. A serially connected resistor 26 and capacitor 27 are connected between lines 24 and 25 in parallel with field winding 4 to eliminate or reduce the effect of transient conditions within the field producing circuit.

In operation, the regulator 16 selectively permits conduction through thyristor 8 during the positive half cycles and through thyristor 9 during the negative half cycles of the single phase alternating input current to supply a controlled direct current output to field winding 4. During a positive half cycle of operation, current is permitted to flow from input terminal 5 through thyristor 8, output terminal 14, field winding 4, primary winding 23, diode 11 to input terminal 6. During the negative half cycle of operation, current is permitted to flow from input terminal 6 through thyristor 9, output terminal 14, field winding 4, primary winding 22, diode 10 to input terminal 5. The amount of current conducted during each half cycle is selectively controlled by the regulator 16 to effectively regulate the amount of direct current supplied to field winding 4.

If a resistive load is provided by motor 1, the load current will consist of each half cycle of the incoming alternating current shortened by the firing angle as directed by the regulator 16. However, an inductive load will continue to circulate load current freely through the bridge circuit 7 during the portion of each half cycle that the A.C. source is not supplying current to the load. Thus, the diodes 10 and 11 will commutate naturally and the thyristors 8 and 9 will each force commutation on the other when the respective incoming half cycle increases above the circulating load current and the thyristors are conductive by the regulator 16.

A current transformer 28 is magnetically coupled to the thyristor-diode bridge circuit 7 and includes a conventional transformer iron core 29 composed of a magnetic susceptible material in which a magnetic flux field may readily be established. The pair of primary windings 22 and 23 are oppositely wound and independently disposed about selected portions of core 29. A secondary winding 30 is independently disposed about core 29 and is connected to a rectifier 31 at terminals 32 and 33. A resistor 34 is parallel connected to winding 30 across terminals 32 and 33. The rectifier 31 consists of a plurality of diodes 35 through 38 arranged in the usual wheatstone type bridge circuit configuration to provide a full wave rectified output signal at a pair of output terminals 39 and 40. A resistor 41 is parallel connected to output terminals 39 and 40 to provide an output voltage to the field regulator control circuit 16.

In operation, the current flowing through field winding 4 alternately flows through the oppositely wound primary windings 22 and 23 in accordance with the alternate conduction through thyristors 8 and 9. As a result, opposed magnetic flux signals are alternately induced in core 29 directly proportional to the direct current flowing through field winding 4. Specifically, current will flow through primary winding 23 during a positive half cycle of the alternating input current to produce a magnetic flux flowing in core 29 in a counter-clockwise direction. Likewise, current flowing during a negative half cycle through winding 22 will induce a magnetic flux flowing in core 29 in a clockwise direction. The alternately opposing magnetic flux signals therefore induce an alternating current signal in the secondary winding 30 proportional to the direct current flowing in field winding 4. The alternating current signal provided by secondary winding 30 is full wave rectified by the rectifier 31 to produce a direct current signal to the resistor 41. The voltage drop across resistor 41 therefore provides an isolated analog voltage output to the field regulator 16 proportional to the current flowing through field winding 4 for proper firing control of the thyristor-diode bridge circuit 7.

FIG. 2 represents a typical graphical illustration in which the ordinate represents the analog voltage across resistor 41 while the abscissa represents the motor field current flowing through winding 4. The waveform 42 therefore illustrates the linear relationship between the isolated analog output voltage and the current flowing through the motor field circuit. The isolated analog voltage signal, as sensed by resistor 41, may therefore be advantageously utilized in measurement operations or as an operating control signal to supply a feedback to the regulator 16 for providing non-reversing crossover speed regulation, reversing crossover speed regulation, crossover voltage regulation, or the like to selectively control the firing of the bridge circuit 7.

Various modes of carrying out the invention are contemplated as being within the scope of the following claims which particularly point out and distinctly claim the subject matter which is regarded as the invention.

I claim:

1. A current sensing apparatus to sense the direct current flowing in a load circuit, comprising an input means for supplying an alternating current input signal, a conduction means connected to said input means and including a pair of branch circuits each conducting said input signal on alternate half cycles for conducting a direct current to said load circuit, and a sensing means electromagnetically coupled to said branch circuits and providing a pair of signals which vary between a reference and a maximum level proportional to the direct current supplied to said load circuit through said pair of branch circuits and including an output means for providing an analog signal proportional to the direct current flowing in said load circuit.

2. The apparatus of claim 1, wherein said sensing means includes a pair of primary windings connected to said pair of branch circuits respectively and magnetically coupled to a core for providing alternately induced opposing magnetic flux signals in said core.

3. The apparatus of claim 2, wherein said output means includes a secondary winding magnetically coupled to said core, a full wave rectifier connected to said secondary winding and having an output for supplying a unidirectional current proportional to the varying magnetic flux signals, and a resistor parallel connected to said rectifier output for supplying a voltage output proportional to the current flowing in said load circuit.

4. A current sensing apparatus to sense the direct current flowing in a load circuit, comprising an input means for supplying an alternating current input signal, a conduction means connected to said input means and including first and second branch circuits for alternately conducting direct current corresponding to each half cycle of said alternating input current signal for selectively conducting a direct current to said load circuit, and a sensing means electromagnetically coupled to said first and second branch circuits to sense the direct load current in said branches and providing a combined signal output to establish a continuous proportional signal.

5. The apparatus of claim 4, wherein said sensing means includes a current transformer coupled to said first and second branch circuits for providing alternately induced opposing magnetic flux signals each proportional to a half cycle of alternating input current.

6. The apparatus of claim 5, wherein said current transformer includes a first and second oppositely wound primary windings connected to said first and second branch circuits, respectively, and a secondary winding electromagnetically coupled to said primary windings and providing the combined output signal.

7. The apparatus of claim 4, and including a field regulator means connected to said sensing means and to said conduction means for providing a feedback signal proportional to load current to effectively regulate conduction through said conduction means.

8. A current sensing apparatus to sense the current flowing in a load coil for a direct current motor, comprising an alternating current input source, a bridge circuit connected to said source and including a pair of thyristors selectively controlled to conduct current with each having a cathode mutually connected to a first output terminal and an anode connected to said input source, first and second diodes each having a cathode connected to said input source with said first diode having an anode connected to a second output terminal through a first primary winding and said second diode having an anode connected to said second terminal through a second primary winding oppositely wound to said first winding, said first and second output terminals connected to said load coil for selectively supplying a direct current controlled by the conduction through said thyristors, a magnetically susceptible core magnetically coupled to said first and second windings for providing alternately induced opposing flux signals proportional to the direct current flowing through said field coil, and a secondary winding magnetically coupled to said core for providing a signal proportional to the varying flux signals for sensing the current flowing in said load circuit.

9. The apparatus of claim 8, and including a rectifier connected to said secondary winding for providing a full wave rectified output signal proportional to said load current.

* * * * *